(12) United States Patent
Yamamoto

(10) Patent No.: US 12,271,103 B2
(45) Date of Patent: Apr. 8, 2025

(54) PROJECTION DISPLAY APPARATUS

(71) Applicant: Panasonic Intellectual Property Management Co., Ltd., Osaka (JP)

(72) Inventor: Norikazu Yamamoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 496 days.

(21) Appl. No.: 17/733,152

(22) Filed: Apr. 29, 2022

(65) Prior Publication Data

US 2022/0365407 A1    Nov. 17, 2022

(30) Foreign Application Priority Data

May 17, 2021    (JP) ................. 2021-083169

(51) Int. Cl.
| | | |
|---|---|---|
| G03B 21/14 | (2006.01) | |
| G02B 5/04 | (2006.01) | |
| G02B 5/30 | (2006.01) | |
| G02B 27/28 | (2006.01) | |

(52) U.S. Cl.
CPC ............... *G03B 21/14* (2013.01); *G02B 5/04* (2013.01); *G02B 5/3058* (2013.01); *G02B 5/3083* (2013.01); *G02B 27/283* (2013.01); *G02B 27/286* (2013.01)

(58) Field of Classification Search
CPC ........ G03B 21/14; G03B 17/17; G03B 17/54; G03B 21/006; G03B 21/2073; G02B 5/04; G02B 5/3058; G02B 5/3083; G02B 27/283; G02B 27/286
See application file for complete search history.

(56) References Cited

U.S. PATENT DOCUMENTS

| | | | |
|---|---|---|---|
| 2002/0003668 A1 | 1/2002 | Sugawara | |
| 2006/0132718 A1* | 6/2006 | Lerner | ................... G02B 27/14 |
| | | | 348/E9.027 |

(Continued)

FOREIGN PATENT DOCUMENTS

| | | |
|---|---|---|
| JP | 2001-290010 | 10/2001 |
| JP | 2005-352078 | 12/2005 |

(Continued)

*Primary Examiner* — Magda Cruz
(74) *Attorney, Agent, or Firm* — Wenderoth, Lind & Ponack, L.L.P.

(57) ABSTRACT

A projection display apparatus includes a projection lens unit that projects image light and on which external light including the image light reflected by a projection target is incident, an optical path separation prism, a narrowband retarder plate and an imaging element. The optical path separation prism includes the first prism having first and second surfaces, the second prism having a third surface disposed on a side of projection lens unit, a fourth surface facing the second surface and a fifth surface, and the polarization separation coating being disposed between the second surface and the fourth surface. The narrowband retarder plate aligns the image light into a first polarization state. Light in a second polarization state in the external light is reflected by the polarization separation coating, is totally internally reflected by the third surface, is emitted from the fifth surface, and is received by the imaging element.

8 Claims, 13 Drawing Sheets

(56) References Cited

U.S. PATENT DOCUMENTS

| | | | | |
|---|---|---|---|---|
| 2006/0132719 | A1* | 6/2006 | Lerner | H04N 9/315 |
| | | | | 348/E9.027 |
| 2006/0274414 | A1 | 12/2006 | Sacre et al. | |
| 2007/0126991 | A1* | 6/2007 | Fujita | H04N 9/3105 |
| | | | | 348/E9.027 |
| 2015/0042564 | A1 | 2/2015 | Shiina et al. | |
| 2016/0196005 | A1 | 7/2016 | Kaneda | |

FOREIGN PATENT DOCUMENTS

| | | | | |
|---|---|---|---|---|
| JP | 2008-287157 | | 1/2008 | |
| JP | 2009139875 A | * | 6/2009 | G02F 1/1335 |
| JP | 2011-228765 | | 11/2011 | |
| JP | 2012-683364 | | 4/2012 | |
| JP | 5085127 | | 11/2012 | |
| JP | 2013-218262 | | 10/2013 | |
| JP | 2015-64550 | | 4/2015 | |
| JP | 2020-64206 | | 4/2020 | |
| JP | 2020-91342 | | 6/2020 | |

* cited by examiner

PROJECTION DISPLAY APPARATUS

BACKGROUND

1. Technical Field

The present disclosure relates to a projection display apparatus including an imaging element.

2. Description of the Related Art

In the related art, a projection display apparatus that projects an image on a projection target such as a screen or a building has been known. In the projection display apparatus of the related art, in order to check a positional relationship (distortion) between the projection target object and a projected image, it is considered that the image projected on the projection target object is imaged and a projection position is adjusted based on the imaged image.

Thus, a projection display apparatus incorporating an imaging element has been studied. For example, Patent Literature (PTL) 1 discloses a projector that shares an optical path of image light and an optical path of imaging light by guiding at least a part of combined light from a color combining element to a projection optical system by an optical path separation element and guiding at least a part of reflected light from the projection optical system to an imaging element.

PTL 1 described above is Unexamined Japanese Patent Publication No. 2020-91342.

SUMMARY

The projector described in PTL 1 still has room for improvement in terms of reducing stray light to the imaging element.

The present disclosure can provide a projection display apparatus that reduces stray light for an imaging element.

A projection display apparatus according to the present disclosure includes an image light emitter that emits image light, a projection lens unit that enlarges and projects the image light incident from the image light emitter on a projection target, and on which external light including the image light reflected by the projection target is incident, an optical path separation prism that is disposed between the image light emitter and the projection lens unit, a narrow-band retarder plate that is disposed between the image light emitter and the optical path separation prism, and aligns the image light into a first polarization state of one of P-polarization and S-polarization, and an imaging element. The optical path separation prism includes a first prism that has a first surface disposed on a side of the image light emitter and perpendicular to an optical axis of the image light and a second surface intersecting the first surface, a second prism that is disposed on a side of the second surface of the first prism, and has a third surface disposed on a side of the projection lens unit and perpendicular to the optical axis, a fourth surface intersecting the third surface and facing the second surface, and a fifth surface intersecting the third surface and the fourth surface, and a polarization separation coating that is disposed between the second surface of the first prism and the fourth surface of the second prism. The polarization separation coating transmits light in the first polarization state, and reflects light in a second polarization state of the other of the P-polarization and the S-polarization. The imaging element is disposed to face the fifth surface of the second prism, and images the external light via the projection lens unit and the optical path separation prism. The image light is incident on the optical path separation prism from the first surface, is transmitted through the polarization separation coating, is emitted from the third surface, and is incident on the projection lens unit. The external light is emitted from the projection lens unit, and is incident on the optical path separation prism from the third surface. Light in the second polarization state in the external light is reflected by the polarization separation coating, is totally internally reflected by the third surface, is emitted from the fifth surface, and is received by the imaging element.

According to the present disclosure, it is possible to provide the projection display apparatus capable of reducing the stray light for the imaging element.

DETAILED DESCRIPTIONS

Background to the Present Disclosure

A projection display apparatus that projects an image on a projection target such as a screen or a building has been known. In the projection display apparatus, in order to check a positional relationship between the projection target and an image to be projected, the image projected on the projection target may be imaged. In this case, a projection position of the image is finely adjusted based on the imaged image.

When the projection display apparatus and an imaging element that images the projected image are separated from each other, since an angle of view adjustment is troublesome, there is a projection display apparatus incorporating an imaging element. In the projection display apparatus incorporating the imaging element, an optical axis of each of an optical path of image light emitted from the projection display apparatus and an optical path for imaging light reflected from the projection target is shared, and thus, the angle of view adjustment can be omitted.

For example, the projector described in PTL 1 also functions as an imaging apparatus in which a projection optical system images a subject on a screen including a projected image and a support. That is, in the projector described in PTL 1, at least a part of the combined light from the color combining element is guided to the projection optical system by an optical path branch element, and at least a part of the reflected light from the projection optical system is guided to the imaging element.

However, in the projector described in PTL 1, since the optical path of the image light and the optical path of the imaging light are shared, there is a problem that stray light within the optical path branch element is incident on the imaging element. When the stray light is incident on the imaging element, the stray light may affect the imaged image.

Thus, the present inventor has studied a projection display apparatus that prevents stray light in an optical path branch element from being incident on an imaging element, and has reached the following invention.

Hereinafter, exemplary embodiments will be described in detail with reference to the drawings as appropriate. It is noted that a more detailed description than necessary may be omitted. For example, the detailed description of already well-known matters and the overlap description of substantially same configurations may be omitted. This is to avoid an unnecessarily redundant description below and to facilitate understanding of a person skilled in the art.

The accompanying drawings and the following description are provided for those skilled in the art to fully understand the present disclosure, and are not intended to limit the subject matter described in the scope of claims.

First Exemplary Embodiment

[1-1. Configuration of Projection Display Apparatus]

Figure 1:
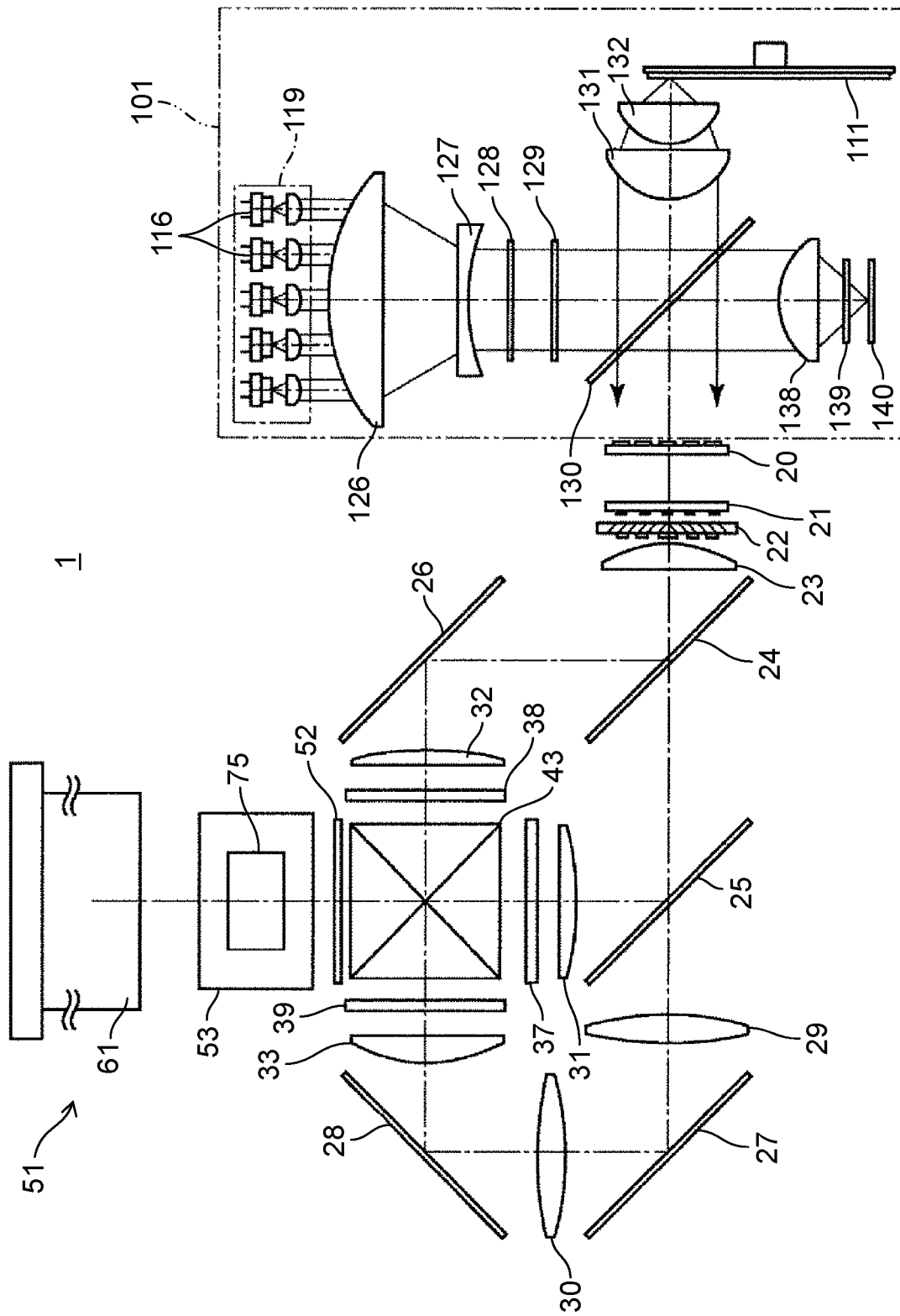
FIG. 1 is a diagram illustrating a configuration of a projection apparatus device according to a first exemplary embodiment.

Projection display apparatus 1 according to a first exemplary embodiment will be described with reference to FIG. 1. FIG. 1 is a configuration diagram of projection display apparatus 1 according to the first exemplary embodiment.

Projection display apparatus 1 uses, as an image forming part, for example, an active matrix-type transmissive panel-type liquid crystal display element in which a thin film transistor is formed in an image region. In the active matrix type, for example, a twisted nematic (TN) mode, a vertical alignment (VA) mode, or the like is adopted.

Light source device 101 includes, for example, blue semiconductor lasers 116, blue solid-state light source unit 119, lenses 126, 127, first diffuser plate 128, first retarder plate 129, dichroic mirror 130, condenser lenses 131, 132, 138, ¼ wave plate 139, diffusion reflector plate 140, and phosphor wheel 111.

Light emitted from light source device 101 is incident on projection lens unit 61 via an optical system including first lens array plate 20, second lens array plate 21, polarization conversion element 22, superimposing lens 23, red-reflecting dichroic mirror 24, green-reflecting dichroic mirror 25, reflection mirrors 26, 27, 28, relay lenses 29, 30, field lenses 31, 32, 33, liquid crystal display elements 37, 38, 39, and color combining prism 43 including a red-reflecting dichroic mirror and a blue-reflecting dichroic mirror. Color combining prism 43 is, for example, a cross-cube prism.

White light from light source device 101 is incident on first lens array plate 20 including a plurality of lens elements. A light flux incident on first lens array plate 20 is divided into a large number of light fluxes. The large number of divided light fluxes are converged on second lens array plate 21 including a plurality of lens elements. The lens elements of first lens array plate 20 have aperture shapes similar to shapes of liquid crystal display elements 37, 38, 39. Regarding the lens elements of second lens array plate 21, a focal length is determined such that first lens array plate 20 and liquid crystal display elements 37, 38, 39 are in an approximate conjugate relation. Light emitted from second lens array plate 21 is incident on polarization conversion element 22.

Polarization conversion element 22 includes a polarization separation prism and a ½ wave plate, and converts natural light from light source device 101 into light in one polarization direction. Since fluorescent light is natural light, the natural light is polarized and converted in one polarization direction. For example, since blue light is incident as S-polarized light, the blue light is converted into P-polarized light. The light from polarization conversion element 22 is incident on superimposing lens 23. Superimposing lens 23 is a lens for superimposing and illuminating the light emitted from each of lens elements of second lens array plate 21 on liquid crystal display elements 37, 38, 39.

The light from superimposing lens 23 is separated into blue, green, and red color light rays by red-reflecting dichroic mirror 24 and green-reflecting dichroic mirror 25 which serve as a color separation part. The green light is transmitted through field lens 31 and is incident on liquid crystal display element 37. The red light is reflected by reflection mirror 26, then is transmitted through field lens 32, and is incident on liquid crystal display element 38. The blue light is transmitted through, is refracted by, and reflected by relay lenses 29, 30 and reflection mirrors 27, 28, is transmitted through field lens 33, and is incident on liquid crystal display element 39.

Three liquid crystal display elements 37, 38, 39 change a polarization state of incident light by controlling a voltage applied to pixels corresponding to the image signals, modulate light in cooperation with incidence-side polarizing plates and emission-side polarizing plates which are arranged on both sides of liquid crystal display elements 37, 38, 39 to be orthogonal to transmission axes, and form green, red, and blue images. Of the color light rays transmitted through liquid crystal display elements 37, 38, 39, the red and blue color light rays are reflected by red-reflecting dichroic mirror and the blue-reflecting dichroic mirror, respectively, the green color light rays are combined by color combining prism 43, and the combined light is incident on projection imaging optical system 51.

[1-2. Configuration of Projection Imaging Optical System]

Figure 2:
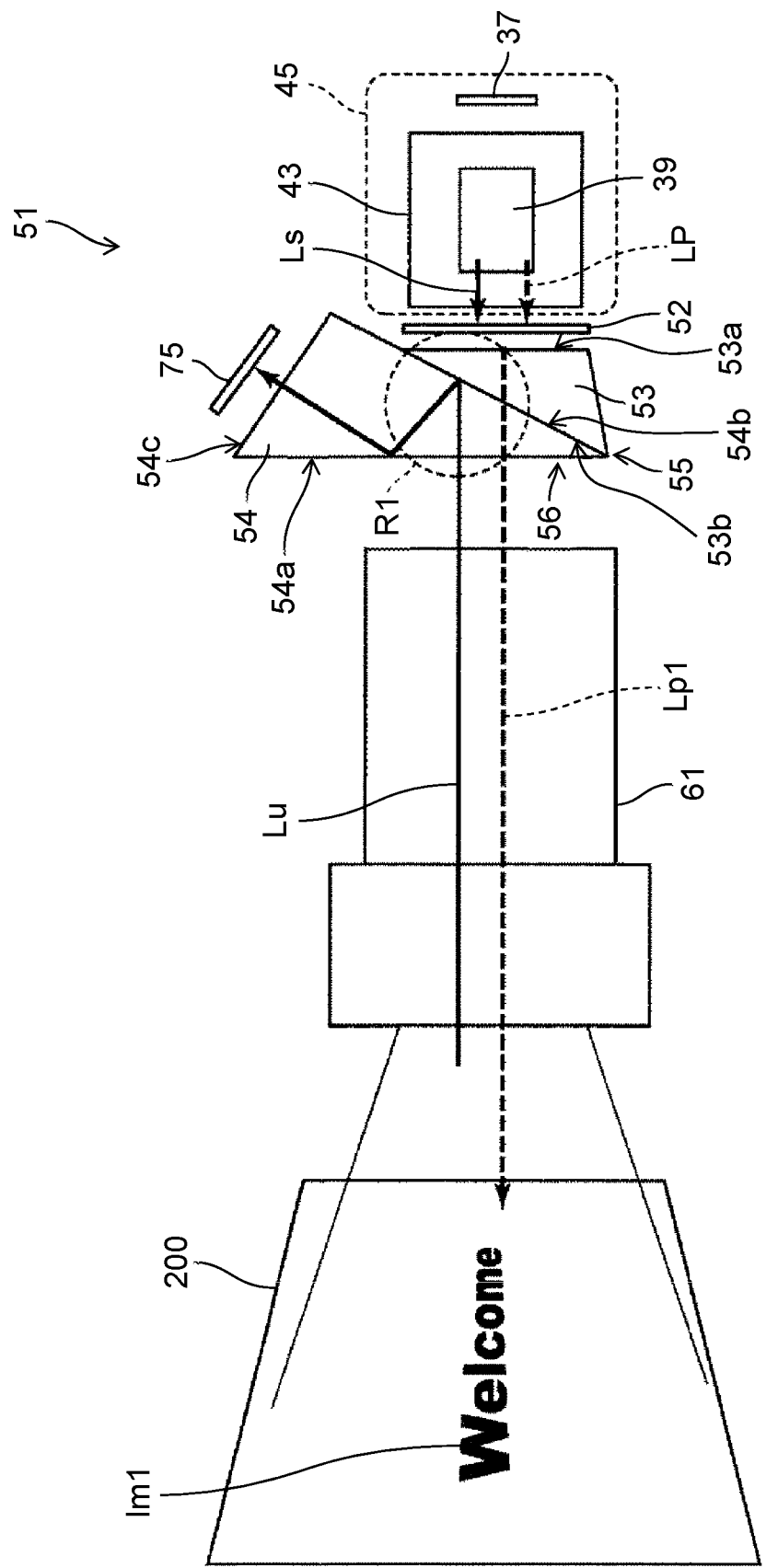
FIG. 2 is a diagram illustrating a configuration of a projection imaging optical system of projection display apparatus 1 of FIG. 1.
Figure 3:
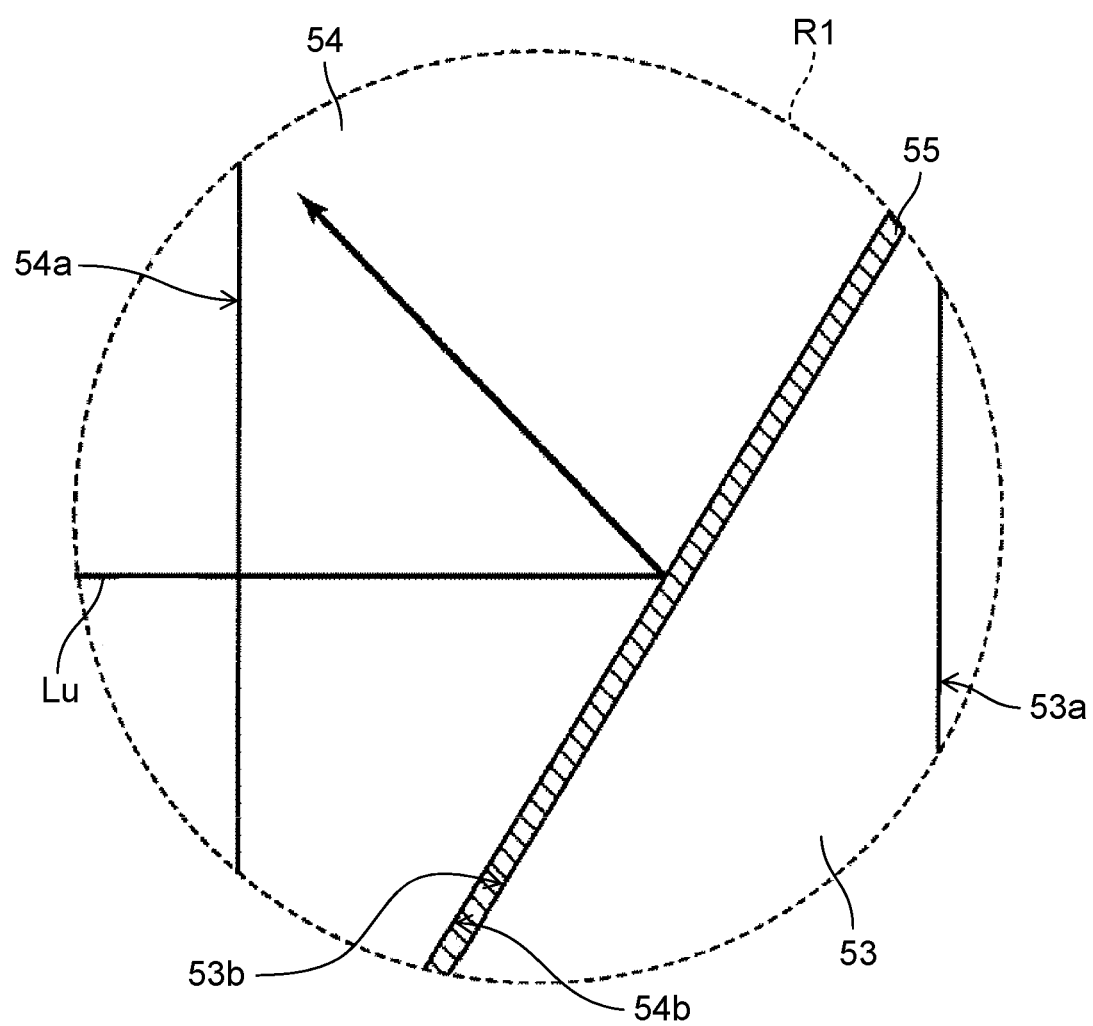
FIG. 3 is an enlarged view of region R1 of FIG. 2.

Projection imaging optical system 51 will be described with reference to FIGS. 2 and 3. FIG. 2 is a diagram illustrating a configuration of projection imaging optical system 51 of projection display apparatus 1 of FIG. 1. FIG. 3 is an enlarged view of region R1 of FIG. 2. As illustrated in FIG. 2, projection imaging optical system 51 includes image light emitter 45, projection lens unit 61, optical path separation prism 56, narrowband retarder plate 52, and imaging element 75.

As illustrated in FIGS. 1 and 2, image light emitter 45 includes liquid crystal display elements 37, 38, 39 and color combining prism 43, and emits image lights Lp, Ls. In the present exemplary embodiment, S-polarized light is polarized light having a vibration surface perpendicular to a paper surface of the drawing, and P-polarized light is polarized light having a vibration surface parallel to the paper surface of the drawing.

As illustrated in FIG. 2, narrowband retarder plate 52 is disposed between image light emitter 45 and optical path separation prism 56. Narrowband retarder plate 52 aligns image lights Lp, Ls emitted from image light emitter 45 into a first polarization state of one of the P-polarization and the S-polarization. In the present exemplary embodiment, S-polarized image light Ls and P-polarized image light Lp are emitted from image light emitter 45. For example, narrowband retarder plate 52 converts incident S-polarized image light Ls into P-polarized image light Lp1 and emits the P-polarized image light, and does not convert incident P-polarized image light Lp but emits the P-polarized image light as P-polarized image light Lp1. That is, in the present exemplary embodiment, the P-polarization is in a first polarization state.

Optical path separation prism 56 includes first prism 53, second prism 54, and polarization separation coating 55 (see FIG. 3). Optical path separation prism 56 is disposed between image light emitter 45 and projection lens unit 61.

First prism 53 is disposed on the image light emitter 45 side and has first surface 53a perpendicular to optical axes of the image lights Lp, Ls and second surface 53b intersecting first surface 53a. Second surface 53b is disposed closer to projection lens unit 61 than first surface 53a. An inner angle formed by first surface 53a and second surface 53b is an acute angle.

Second prism 54 is disposed on second surface 53b side of first prism 53. Second prism 54 has third surface 54a perpendicular to an optical axis disposed on the projection lens unit 61 side, fourth surface 54b intersecting the third surface and facing second surface 53b, and fifth surface 54c intersecting with third surface 54a and fourth surface 54b. Fifth surface 54c intersects third surface 54a and fourth surface 54b and is disposed on a side opposite to first prism 53. An inner angle formed by third surface 54a and fifth surface 54c is an acute angle.

As illustrated in FIG. 3, polarization separation coating 55 is disposed between second surface 53b of first prism 53 and fourth surface 54b of second prism 54. Polarization separation coating 55 transmits light in the first polarization state of one of the P-polarization and the S-polarization and reflects light in a second polarization state of the other of the P-polarization and the S-polarization. In the present exemplary embodiment, since the first polarization state is the P-polarization, polarization separation coating 55 transmits P-polarized light (first polarization state) and reflects the S-polarized light (second polarization state).

For example, a wire grid polarizing plate or a polarizing beam splitter can be used as polarization separation coating 55. In the present exemplary embodiment, the wire grid polarizing plate is employed as polarization separation coating 55. Due to high performance with respect to angular characteristics, as will be described later, the wire grid polarizing plate is preferable when angle θ1 (see FIG. 4) formed by third surface 54a and fourth surface 54b of second prism 54 is smaller than 45 degrees.

Thus, P-polarized image light Lp1 incident on optical path separation prism 56 is transmitted through polarization separation coating 55. On the other hand, S-polarized image light Ls incident on optical path separation prism 56 is reflected and is changed in a traveling direction. Accordingly, P-polarized image light Lp1 emitted from image light emitter 45 and passing through narrowband retarder plate 52 is transmitted through optical path separation prism 56 and is emitted toward projection lens unit 61.

Projection lens unit 61 enlarges and projects image light Lp1 incident from image light emitter 45 on screen 200 as a projection target. External light Lu including image light Lp1 reflected by the projection target is incident on projection lens unit 61.

P-polarized image light Lp1 emitted from image light emitter 45 and transmitted through narrowband retarder plate 52 is incident on optical path separation prism 56 from first surface 53a of first prism 53. When the light is incident on optical path separation prism 56, the light is transmitted through polarization separation coating 55, is emitted from optical path separation prism 56 from third surface 54a of second prism 54, and is incident on projection lens unit 61.

Image light Lp1 is enlarged by projection lens unit 61 and is projected on screen 200, and image Im1 is projected on screen 200. External light Lu including image light Lp1 reflected by screen 200 is emitted from projection lens unit 61, and is incident on optical path separation prism 56 from third surface 54a of second prism 54. External light Lu is incident on second prism 54 from a direction orthogonal to third surface 54a of second prism 54. External light Lu incident on optical path separation prism 56 reflects the S-polarized light (second polarization state) by polarization separation coating 55. The S-polarized light reflected by polarization separation coating 55 travels within second prism 54 toward third surface 54a of second prism 54, and is totally internally reflected by third surface 54a. The light totally internally reflected by third surface 54a travels toward imaging element 75, is emitted from fifth surface 54c through second prism 54, and is received by imaging element 75.

Since external light Lu is totally internally reflected by third surface 54a of second prism 54, an optical path length of external light Lu can be increased until the external light is received by imaging element 75. The total internal reflection means that external light Lu incident on third surface 54a from an inside of second prism 54 is not transmitted from third surface 54a to an outside of second prism 54 but is totally reflected by third surface 54a. Thus, an element for adjusting the optical path length, such as a prism spacer, may not be disposed. Accordingly, projection display apparatus 1 can be downsized.

Imaging element 75 is disposed to face fifth surface 54c of second prism 54. Imaging element 75 images external light Lu via projection lens unit 61 and optical path separation prism 56. In the present exemplary embodiment, imaging element 75 images, among external light Lu, the S-polarized light reflected by polarization separation coating 55. Imaging element 75 includes, for example, a CMOS sensor or a CCD sensor.

Figure 4:
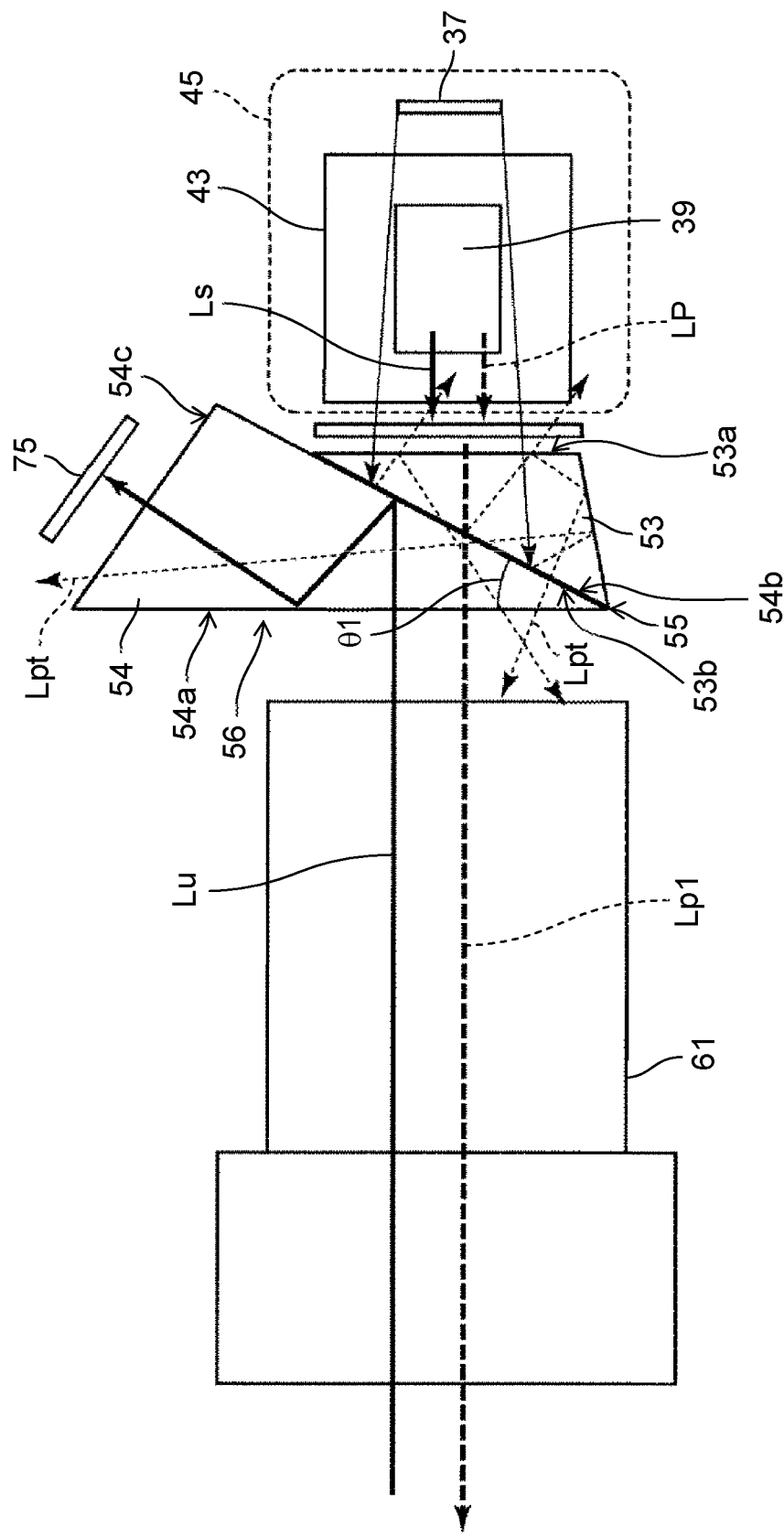
FIG. 4 is a schematic diagram illustrating a path of stray light in an optical path separation prism of FIG. 2.

FIG. 4 is a schematic diagram illustrating a path of stray light in optical path separation prism 56 of FIG. 2. Reduction of stray light incident on imaging element 75 will be described with reference to FIG. 4.

As illustrated in FIG. 4, P-polarized image light Lp1 incident on optical path separation prism 56 from narrowband retarder plate 52 is not completely transmitted through polarization separation coating 55 of optical path separation prism 56, but is partially reflected to become stray light Lpt that is repeatedly reflected within optical path separation prism 56. In the present exemplary embodiment, angle θ1 formed by third surface 54a and fourth surface 54b of second prism 54 is smaller than 45 degrees. Thus, an angle of polarization separation coating 55 with respect to an optical axis of image light Lp1 is larger than 45 degrees.

When polarization separation coating 55 is disposed in this manner, stray light Lpt reflected by polarization separation coating 55 is easily totally reflected inside first prism 53. Stray light Lpt transmitted through polarization separation coating 55 is often incident at an angle less than a total reflection angle on third surface 54a of second prism 54, and is easily transmitted through second prism 54 and escapes to the projection lens unit 61 side. Thus, the stray light incident on imaging element 75 can be greatly reduced.

[1-3. Effects and the Like]

According to the above-described embodiment, since angle θ1 formed by third surface 54a and fourth surface 54b of second prism 54 is smaller than 45 degrees, the angle of polarization separation coating 55 with respect to the optical axis of image light Lp1 is larger than 45 degrees. When polarization separation coating 55 is disposed in this manner, stray light Lpt reflected by polarization separation coating 55 is easily totally reflected inside first prism 53, and it is possible to provide the projection display apparatus capable of reducing the stray light to the imaging element.

External light Lu received by imaging element 75 is totally internally reflected by third surface 54a of second prism 54 of optical path separation prism 56. Thus, since an optical path of external light Lu becomes long, the element for adjusting the optical path length such as a prism spacer may not be disposed. Thus, projection display apparatus 1 can be downsized.

Since angle θ1 formed by third surface 54a and fourth surface 54b of second prism 54 is smaller than 45 degrees, optical path separation prism 56 can be downsized, and projection display apparatus 1 can be downsized.

Angle θ1 formed by third surface 54a and fourth surface 54b of second prism 54 may be from 20 degrees to 35 degrees inclusive. In this case, total reflection characteristics of stray light Lpt on second surface 53b of first prism 53 can be improved, and stray light Lpt incident on imaging element 75 can be further reduced.

Second Exemplary Embodiment

A second exemplary embodiment will be described with reference to FIGS. 5A and 5B. In the second exemplary embodiment, the same or equivalent configurations as those in the first exemplary embodiment are denoted by the same reference numerals as those in the first exemplary embodiment. The description already given for the first exemplary embodiment is omitted for the second exemplary embodiment.

Figure 5A:
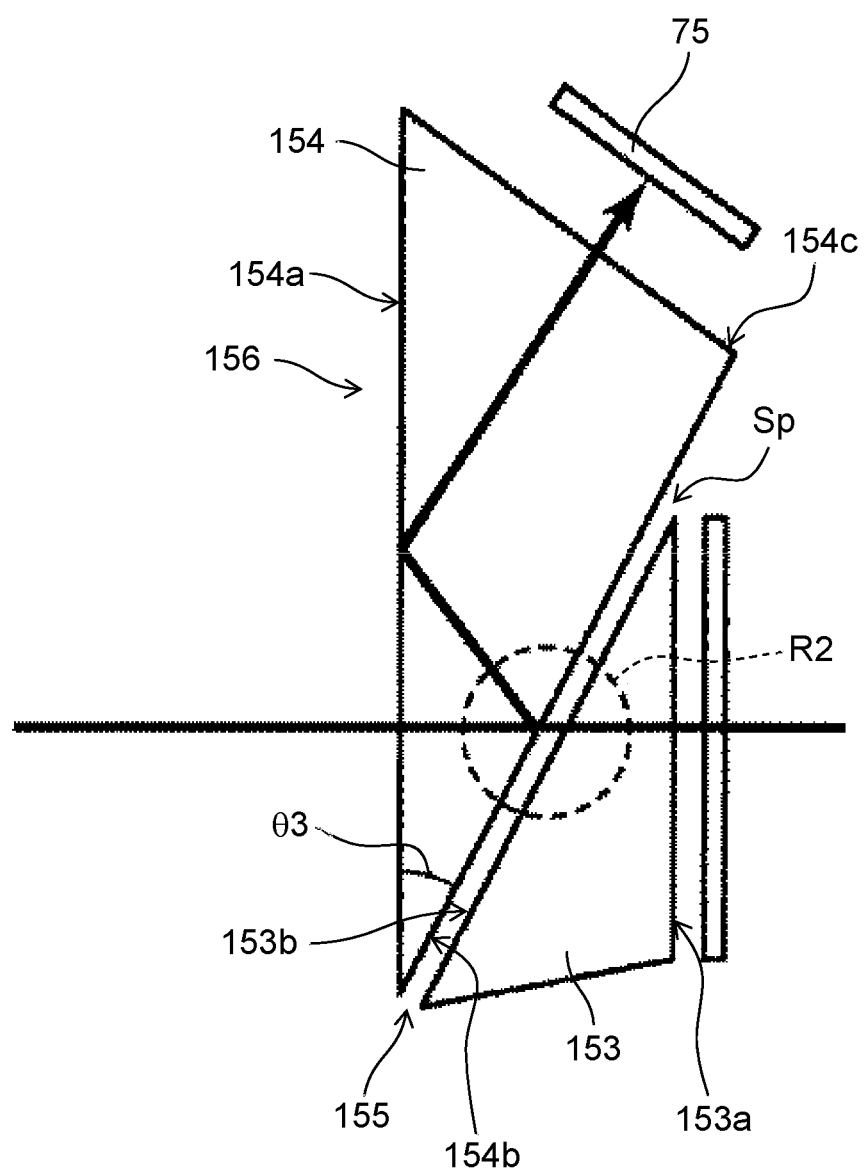
FIG. 5A is a schematic diagram illustrating an optical path separation prism according to a second exemplary embodiment.

FIG. 5A is a schematic diagram illustrating optical path separation prism 156 according to the second exemplary embodiment. FIG. 5B is an enlarged view of region R1 of FIG. 5A. As illustrated in FIGS. 5A and 5B, the second exemplary embodiment is different from the first exemplary embodiment in that gap Sp is provided between second surface 153b of first prism 153 and fourth surface 154b of second prism 154. The present exemplary embodiment is different from the first exemplary embodiment in that polarization separation coating 155 is disposed on fourth surface 154b of second prism 154.

Figure 5B:
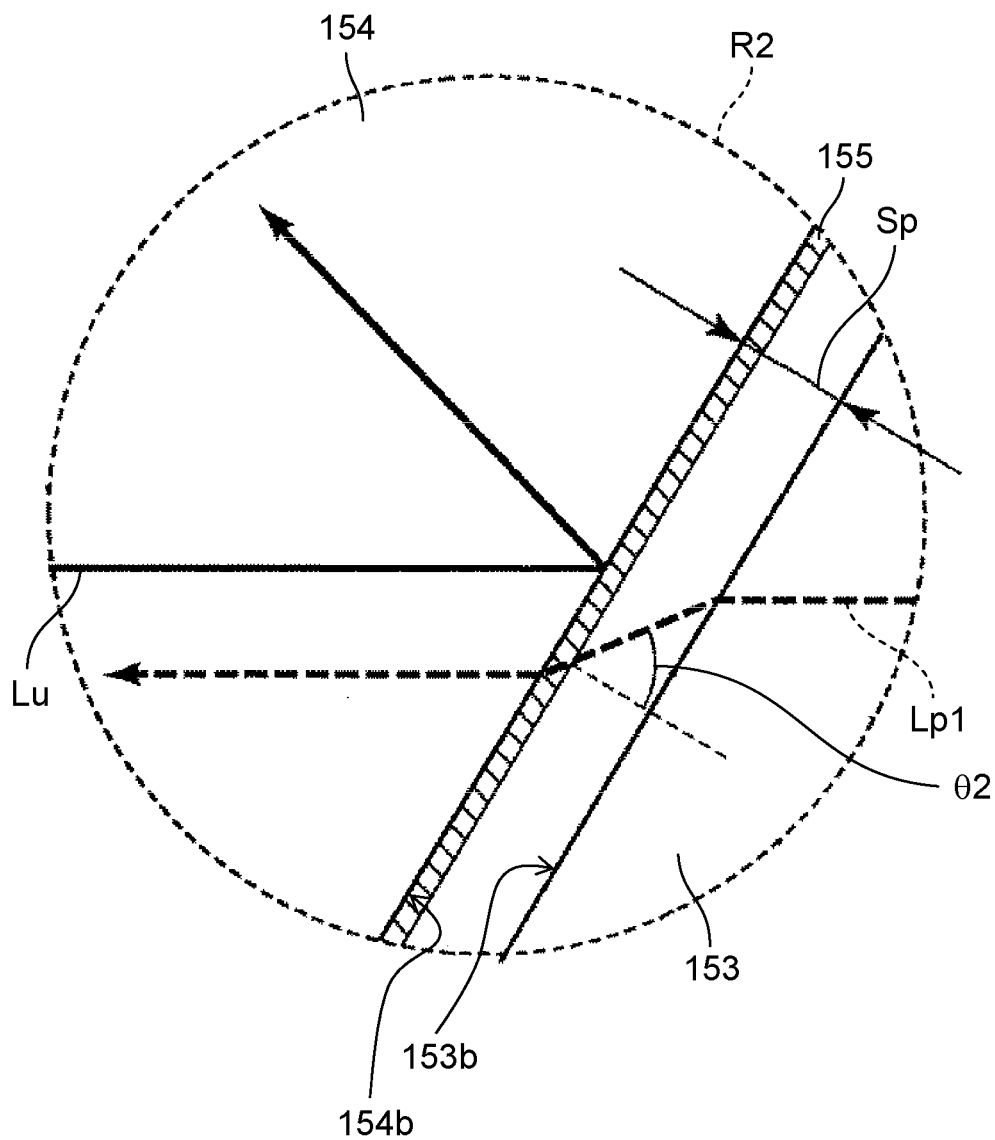
FIG. 5B is an enlarged view of region R2 of FIG. 5A.

As illustrated in FIGS. 5A and 5B, in the present exemplary embodiment, gap Sp is provided between second surface 153b of first prism 153 and fourth surface 154b of second prism 154. A size of gap Sp is a distance between second surface 53b of first prism 53 and fourth surface 54b of second prism 54, and may be set to, for example, from 3 μm to 10 μm inclusive. When the size of gap Sp is larger than 10 μm, a resolution of image Im1 projected on screen 200 may decrease. Since the optical path length changes due to refraction, astigmatism may occur. Thus, the size of gap Sp is preferably from 3 μm to 10 μm inclusive.

Gap Sp between second surface 153b of first prism 153 and fourth surface 154b of second prism 154 is provided, and thus, image light Lp1 incident on optical path separation prism 156 from first surface 153a is refracted when being emitted from second surface 153b toward gap Sp. Subsequently, incident angle θ2 when being transmitted through polarization separation coating 155 and being incident on second prism 154 can be set to be near 45 degrees. Incident angle θ2 indicates an angle at which the light incident is inclined with respect to a direction perpendicular to second surface 153b.

In a case where the wire grid polarizing plate is used as polarization separation coating 155, when incident angle θ2 is around 45 degrees, a transmittance of the P-polarized light in polarization separation coating 155 is high. Thus, gap Sp is provided between first prism 153 and second prism 154, and thus, a transmittance of P-polarized image light Lp1 can be increased in polarization separation coating 155.

For example, when BK7 which is a glass material having a refractive index ne=1.51872 is used as materials of first prism 153 and second prism 154 and angle θ3 formed by third surface 154a and fourth surface 154b of second prism 154 is 27 degrees, incident angle θ2 of image light Lp1 to polarization separation coating 155 can be about 43.6 degrees.

When a material having refractive index ne of about 1.5 to 1.75 is used as the materials of first prism 153 and second prism 154, angle θ3 formed by third surface 154a and fourth surface 154b of second prism 154 may be from 20 degrees to 35 degrees inclusive. In this case, incident angle θ2 of image light Lp1 when being incident on polarization separation coating 155 via first prism 153 can be set near 45 degrees.

Figure 6:
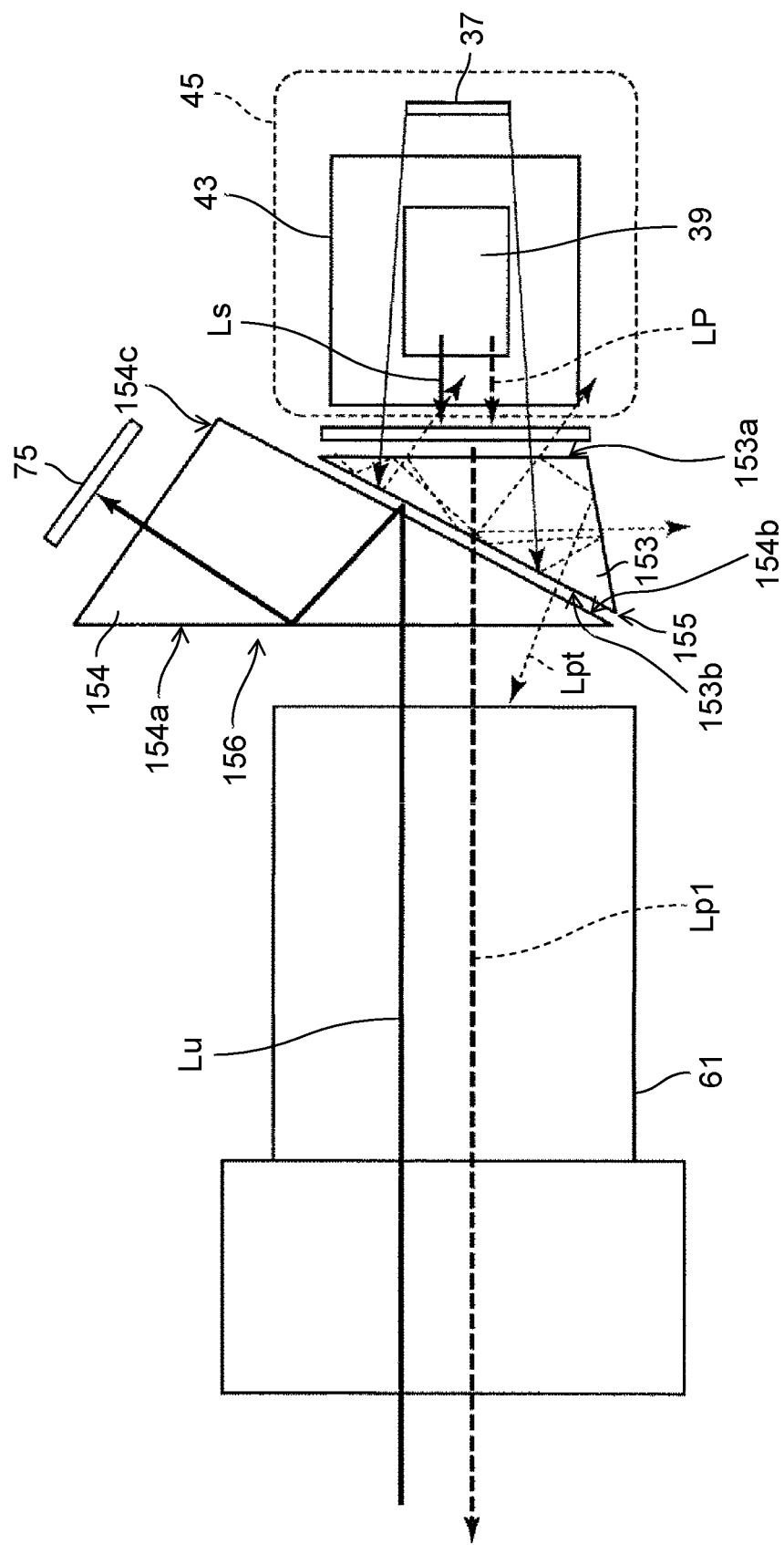
FIG. 6 is a schematic diagram illustrating a path of stray light in the optical path separation prism of FIG. 5A.

FIG. 6 is a schematic diagram illustrating a path of stray light in optical path separation prism 156 of FIG. 5A. Reduction of stray light incident on imaging element 75 in the present exemplary embodiment will be described with reference to FIG. 6.

When gap Sp is provided between second surface 153b of first prism 153 and fourth surface 154b of second prism 154, the amount of stray light Lpt totally reflected by second surface 153b of first prism 153 increases. Thus, stray light Lpt incident on second prism 154 is greatly reduced. Accordingly, the stray light incident on imaging element 75 can be reduced.

According to the above-described embodiment, the stray light incident on second prism 154 can be reduced. Thus, the stray light incident on imaging element 75 can be greatly reduced.

Third Exemplary Embodiment

A third exemplary embodiment will be described with reference to FIG. 7. In the third exemplary embodiment, the same or equivalent configurations as those in the second exemplary embodiment are denoted by the same reference numerals as those in the second exemplary embodiment. The description already given for the second exemplary embodiment is omitted for the third exemplary embodiment.

Figure 7:
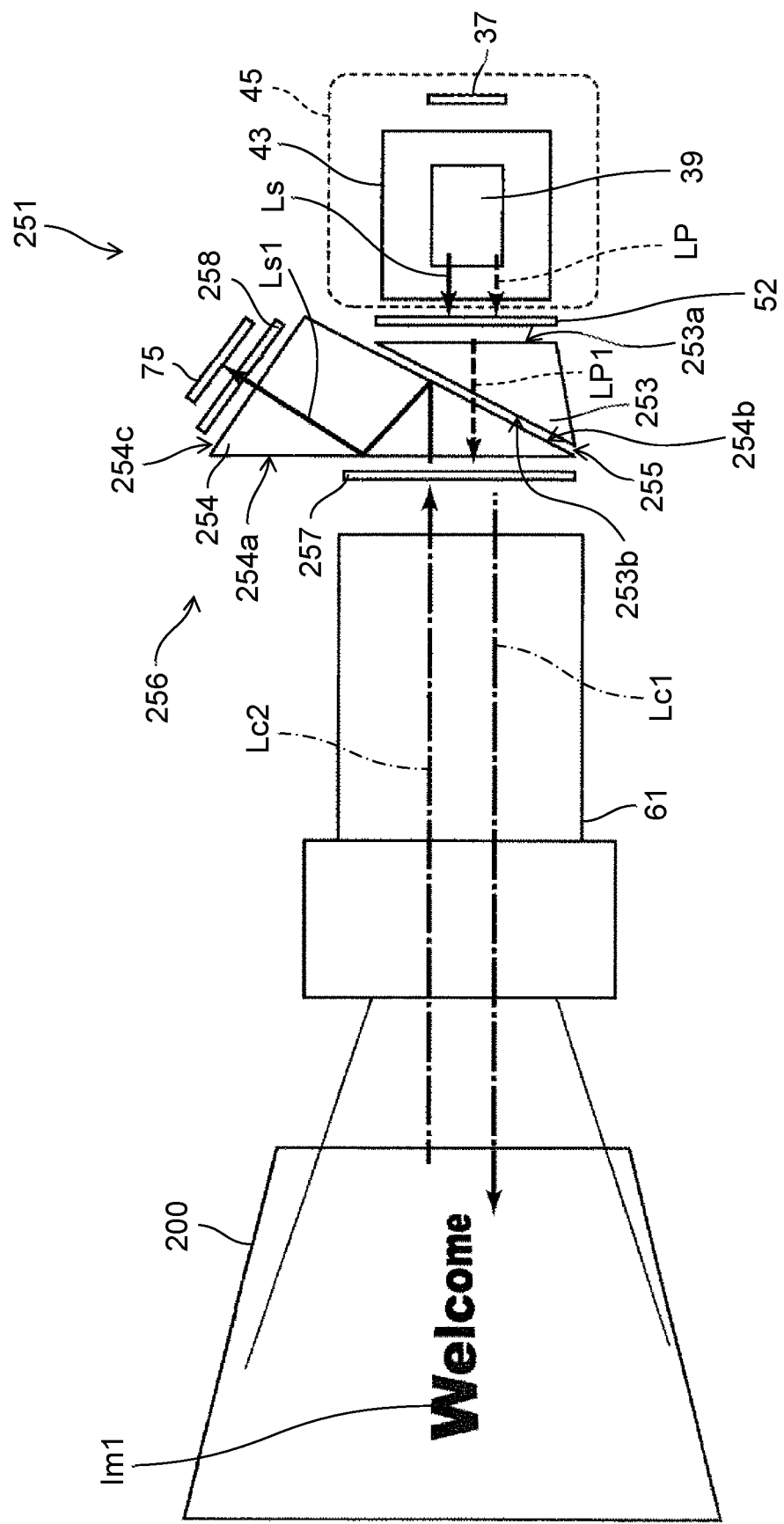
FIG. 7 is a schematic diagram illustrating a configuration of a projection imaging optical system according to a third exemplary embodiment.

FIG. 7 is a schematic diagram illustrating a configuration of projection imaging optical system 251 according to the third exemplary embodiment. As illustrated in FIG. 7, the third exemplary embodiment is different from the second exemplary embodiment in that projection imaging optical system 251 includes ¼ wave plate 257 and polarizing plate 258.

¼ wave plate 257 is disposed between optical path separation prism 256 and projection lens unit 61. ¼ wave plate 257 converts image light Lp1 from the first polarization state into circularly polarization, and converts external light Lu from the circularly polarization into the second polarization state.

In the present exemplary embodiment, P-polarized (first polarization state) image light Lp1 incident from narrowband retarder plate 52 is converted into circularly polarized image light Lc. Image light Lc emitted from ¼ wave plate 257 is enlarged by projection lens unit 61 and is projected on screen 200.

Circularly polarized image light Lc1 constituting image Im1 projected on screen 200 is reflected by screen 200 and is incident on projection lens unit 61. External light Lc2 reflected by screen 200 also contains a large amount of circularly polarized components. External light Lc2 travels from projection lens unit 61 toward optical path separation prism 256 and is incident on ¼ wave plate 257. Circularly polarized external light Lc2 incident on ¼ wave plate 257 is converted into S-polarized external light Ls1 and is incident on optical path separation prism 256.

External light Ls1 incident on optical path separation prism 256 is reflected by polarization separation coating 255, is totally reflected by third surface 254a of second prism 254, and is incident on imaging element 75.

Polarizing plate 258 is disposed between optical path separation prism 256 and imaging element 75, and allows external light Ls1 to pass therethrough. In the present exemplary embodiment, polarizing plate 258 transmits S-polarized (second polarization state) external light Ls1, and blocks light in a polarization state other than the S-polarization. Accordingly, external light Ls1 emitted from optical path separation prism 256 toward imaging element 75 is transmitted through polarizing plate 258 and is transmitted to imaging element 75, but stray light or the like containing a large amount of P-polarized components within optical path separation prism 256 is blocked by the polarizing plate. Accordingly, the stray light incident on imaging element 75 can be further reduced, and the image projected on screen 200 can be imaged with high sensitivity.

According to the above-described embodiment, the stray light incident on imaging element 75 can be further reduced. The image projected on screen 200 can be imaged with high sensitivity.

Figure 8:
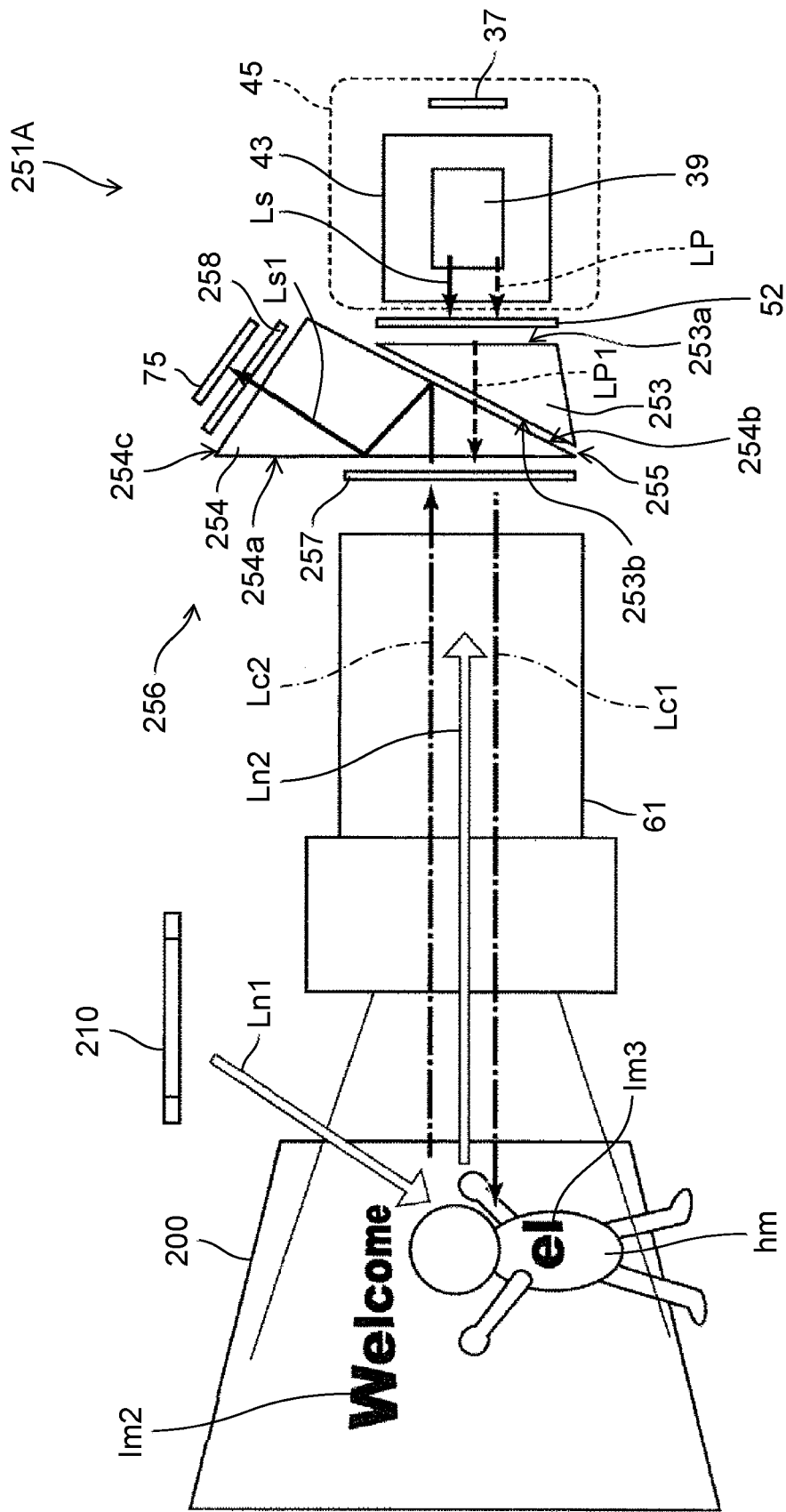
FIG. 8 is a schematic diagram illustrating a configuration of a projection imaging optical system according to a first modification of the third exemplary embodiment.
Figure 9:
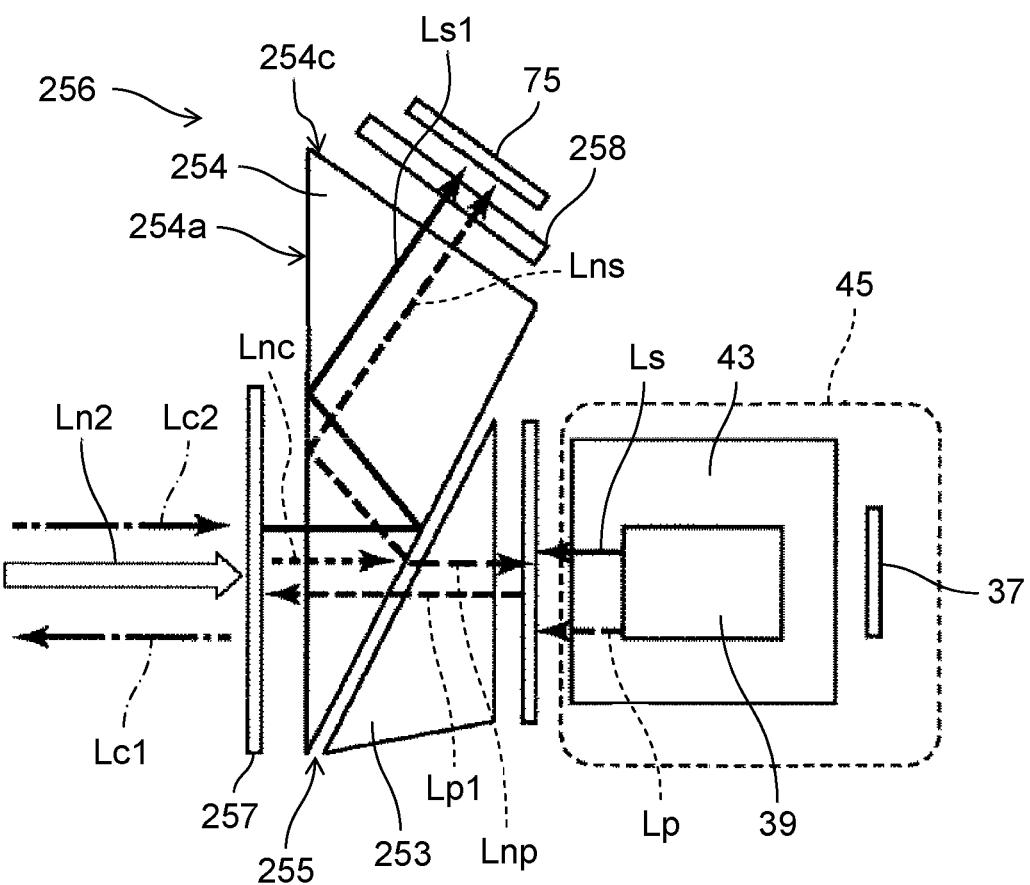
FIG. 9 is a schematic diagram illustrating an optical path in an optical path separation prism of FIG. 8.
Figure 10:
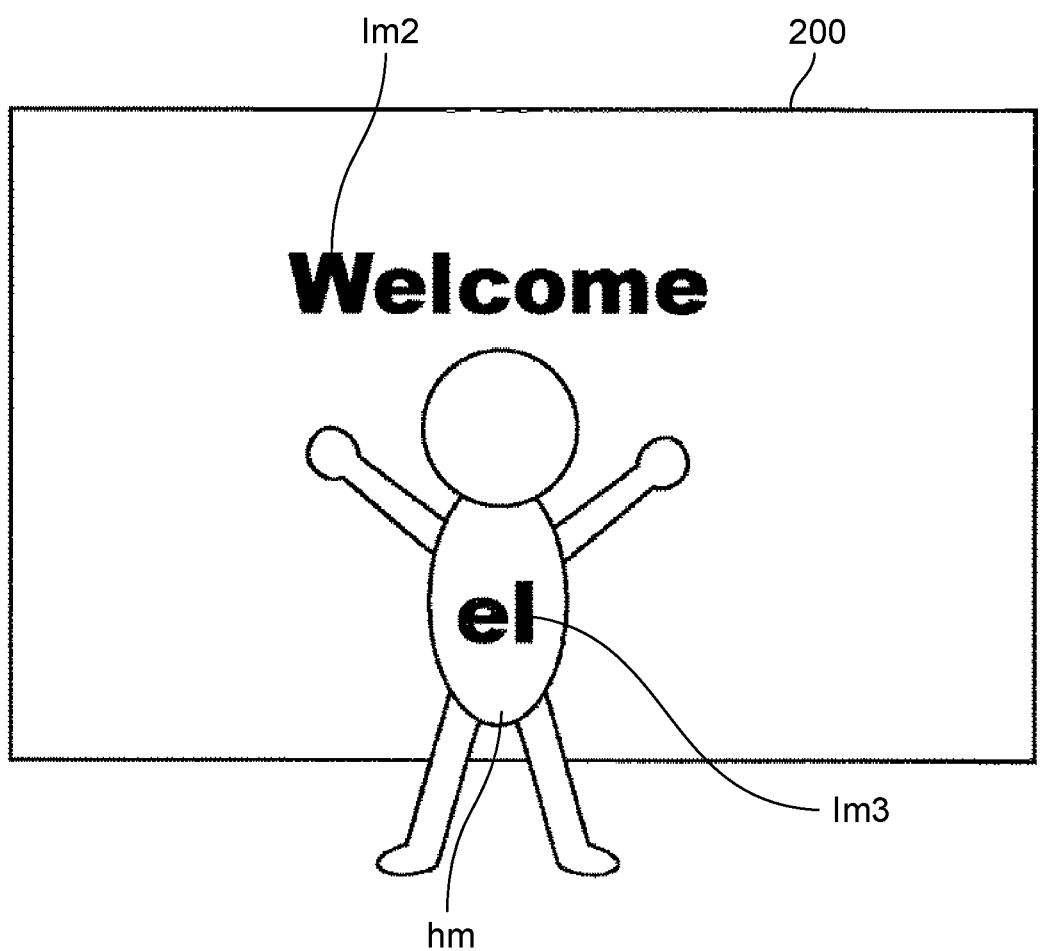
FIG. 10 is a diagram illustrating an example of an image imaged by an imaging element in the first modification.

FIG. 8 is a schematic diagram illustrating a configuration of projection imaging optical system 251A according to a first modification of the third exemplary embodiment. FIG. 9 is a schematic diagram illustrating an optical path in optical path separation prism 256 of FIG. 8. FIG. 10 is a diagram illustrating an example of an image imaged by imaging element 75 in the first modification. The first modification of the third exemplary embodiment will be described with reference to FIGS. 8 to 10.

As illustrated in FIG. 8, there may be movable object hm in front of screen 200. Object hm is, for example, a human or a robot in front of screen 200. In this case, a part of projected image light Lc1 is projected, as image Im2, on screen 200, and a part of the projected image light is projected, as image Im, on object hm. In the example of FIG. 8, characters are projected as examples of image Im2 and image Im3.

Illumination light Ln1 is illuminated toward object hm from external illumination light source 210. Alternatively, object hm may be illuminated with ambient light around screen 200. Illumination light Ln1 or the ambient light is unpolarized light. Illumination light Ln1 or illumination light Ln2 reflected by object hm by illuminating object hm with the ambient light passes through projection lens unit 61, and is incident on ¼ wave plate 257.

As illustrated in FIG. 9, in projection imaging optical system 251A of the first modification, illumination light Ln2 is transmitted through ¼ wave plate 257 and is converted into circularly polarized illumination light Lnc. An S-polarized component (illumination light Lns) reflected by polarization separation coating 255 in illumination light Lnc is totally reflected by third surface 254a of second prism 254, is emitted from fifth surface 254c, and is received by imaging element 75 via polarizing plate 258. An S-polarized component of the ambient light is similarly received by imaging element 75. Of circularly polarized illumination light Lnc, the P-polarized component (illumination light Lnp) is transmitted through polarization separation coating 255 and is incident on first prism 253. When imaging element 75 receives illumination light Lns, as illustrated in FIG. 10, imaging element 75 images both an image by illumination light Lns and the ambient light and an image by external light Ls1.

Figure 11:
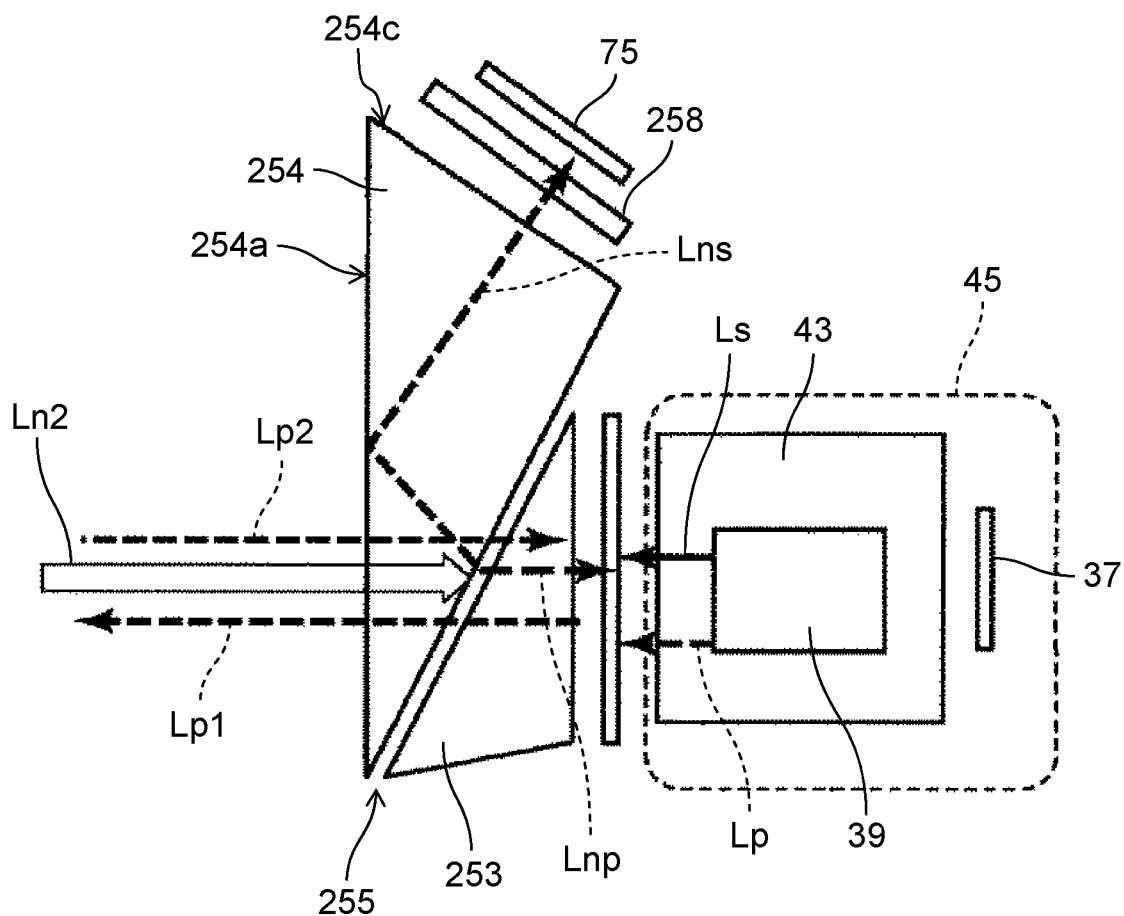
FIG. 11 is a schematic diagram illustrating an optical path in the optical path separation prism when a ¼ wave plate is removed.
Figure 12:
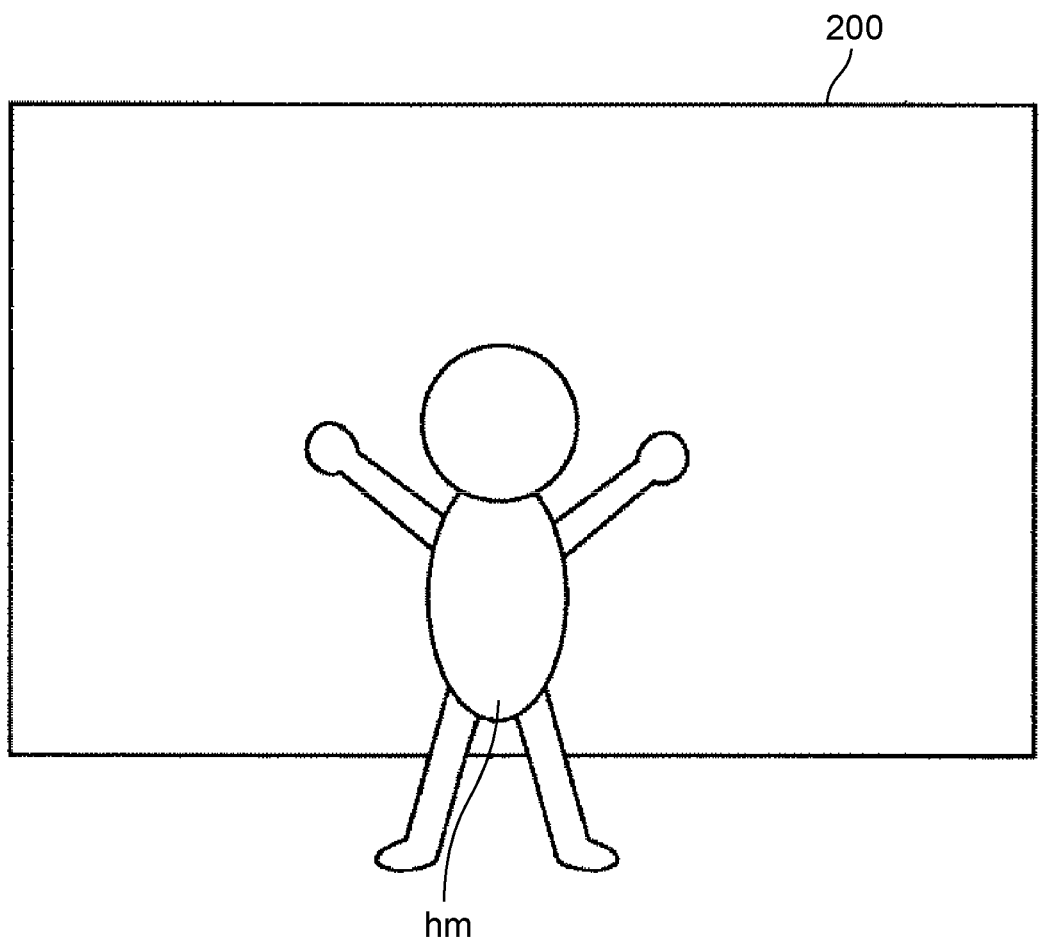
FIG. 12 is a diagram illustrating an example of an image imaged by an imaging element when the ¼ wave plate is removed.

¼ wave plate 257 may be detachable. FIG. 11 is a schematic diagram illustrating the optical path in optical path separation prism 256 when ¼ wave plate 257 is removed. FIG. 12 is a diagram illustrating an example of an image imaged by imaging element 75 when ¼ wave plate 257 is removed.

As illustrated in FIG. 11, when ¼ wave plate 257 is removed, the S-polarized component (illumination light Lns) of illumination light Ln2 is reflected by polarization separation coating 255, is totally reflected by third surface 254a of second prism 254, is emitted from fifth surface 254c, and is received by imaging element 75 via polarizing plate 258. Similarly, the S-polarized component of the ambient light is received by imaging element 75. On the other hand, since external light Lp2 reflected by screen 200 remains as P-polarized light, the external light is transmitted through polarization separation coating 255 and is not received by imaging element 75.

When ¼ wave plate 257 is removed, as illustrated in FIG. 12, an image by illumination light Lns and the ambient light is imaged by imaging element 75, and image Im2 projected by external light Lp2 is not imaged. Accordingly, object hm can be imaged without being affected by a projected image. In this case, for example, an image following a person or an object can be projected by detecting the person or the object and combining the person or the object with the projected image.

Since illumination light Ln1 or the ambient light often has a small amount of light, it is desirable that stray light generated from optical path separation prism 256, the lens of projection lens unit 61, or the like is not incident on imaging element 75 in order to image the person or the object except for the projected image. ¼ wave plate 257 is attached or detached, and thus, it is possible to easily image an image from which the projected image is removed.

Other Exemplary Embodiments

As described above, the above exemplary embodiments have been described as examples of the techniques disclosed in the present application. However, the techniques in the present disclosure are not limited to the above exemplary embodiments, and can also be applied to exemplary embodiments in which change, substitution, addition, omission, and the like are performed. A new exemplary embodiment can also be made by combining the respective components described in the exemplary embodiments above.

In each exemplary embodiment, when the image lights of the S-polarized light and the image light of the P-polarized light are used, these polarization states may be exchanged. For example, the image light emitted from narrowband retarder plate 52 may be S-polarized light, and the image light incident on imaging element 75 may be P-polarized light.

In the exemplary embodiments, image light emitter 45 includes three liquid crystal display elements as light modulation elements, but the present disclosure is not limited thereto. Image light emitter 45 may include a digital micromirror device (DMD) instead of the liquid crystal display element. Since the polarization of the image light emitted from the DMD is also aligned by narrowband retarder plate 52, the same effects as the effects of the exemplary embodiments can be obtained.

As described above, the exemplary embodiments have been described as examples of the techniques of the present disclosure. The accompanying drawings and the detailed descriptions have been presented for this purpose. Accordingly, in order to exemplify the technique described above, components illustrated or described in the accompanying drawings and the detailed description may not only include components that are essential for solving the problems, but may also include components that are not essential for solving the problems. Accordingly, when those non-essential components are described in the accompanying drawings and detailed description, the non-essential components should not be immediately acknowledged to be essential based on only the description.

The above exemplary embodiments are provided to exemplify the technique according to the present disclosure. Therefore, it is possible to make various changes, replacements, additions, omissions, for example, within the scope of the claims and equivalents thereof.

Outline of Exemplary Embodiment (1) A projection display apparatus of the present disclosure includes an image light emitter that emits image light, a projection lens unit that enlarges and projects the image light incident from the image light emitter on a projection target, and on which external light including the image light reflected by the projection target is incident, an optical path separation prism that is disposed between the image light emitter and the projection lens unit, a narrowband retarder plate that is disposed between the image light emitter and the optical path separation prism, and aligns the image light into a first polarization state of one of P-polarization and S-polarization, and an imaging element. The optical path separation prism includes a first prism that has a first surface disposed on a side of the image light emitter and perpendicular to an optical axis of the image light and a second surface intersecting the first surface, a second prism that is disposed on a side of the second surface of the first prism, and has a third surface disposed on a side of the projection lens unit and perpendicular to the optical axis, a fourth surface intersecting the third surface and facing the second surface, and a fifth surface intersecting the third surface and the fourth surface, and a polarization separation coating that is disposed between the second surface of the first prism and the fourth surface of the second prism. The polarization separation coating transmits light in the first polarization state, and reflects light in a second polarization state of the other of the P-polarization and the S-polarization. The imaging element is disposed to face the fifth surface of the second prism, and images the external light via the projection lens unit and the optical path separation prism. The image light is incident on the optical path separation prism from the first surface, is transmitted through the polarization separation coating, is emitted from the third surface, and is incident on the projection lens unit. The external light is emitted from the projection lens unit, and is incident on the optical path separation prism from the third surface. Light in the second polarization state in the external light is reflected by the polarization separation coating, is totally internally reflected by the third surface, is emitted from the fifth surface, and is received by the imaging element.

With such a configuration, it is possible to provide the projection display apparatus capable of reducing the stray light to the imaging element.

(2) In the projection display apparatus of (1), a gap may be provided between the second surface of the first prism and the fourth surface of the second prism, and the polarization separation coating may be disposed on the fourth surface.

With such a configuration, the stray light incident on the second prism of the optical path separation prism can be greatly reduced. Thus, the stray light incident on the imaging element can be reduced.

(3) In the projection display apparatus of (2), the gap may have a size from 3 μm to 10 μm inclusive.

With such a configuration, the stray light is highly likely to be totally reflected by the second surface of the first prism, and the stray light incident on the imaging element can be reduced.

(4) In the projection display apparatus of any one of (1) to (3), the polarization separation coating may be a wire grid polarizing plate.

With such a configuration, the effect of reducing stray light can be further improved.

(5) In the projection display apparatus of any one of (1) to (4), an angle formed by the third surface and the fourth surface of the second prism may be from 20 degrees to 35 degrees inclusive.

With such a configuration, the optical path separation prism can be thinned, and the projection display apparatus can be downsized.

(6) The projection display apparatus of any one of (1) to (5) may further include a ¼ wave plate that is disposed between the optical path separation prism and the projection lens unit, converts the image light from the first polarization state into circularly polarization, and converts the external light form circularly polarization into the second polarization state.

With such a configuration, the external light can be efficiently incident on the imaging element, and the image light projected on the projection target can be imaged with high sensitivity.

(7) In the projection display apparatus of (6), the ¼ wave plate may be detachably disposed.

With such a configuration, the ¼ wave plate can be disposed as necessary.

(8) The projection display apparatus any one of (1) to (7) may further include a polarizing plate that is disposed between the optical path separation prism and the imaging element, and transmits the external light.

With such a configuration, the stray light incident on the imaging element can be further reduced.

The present disclosure is applicable to a projection display apparatus that projects an image.

What is claimed is:

1. A projection display apparatus comprising:
   an image light emitter that emits image light;
   a projection lens unit that enlarges and projects the image light incident from the image light emitter on a projection target, and on which external light including the image light reflected by the projection target is incident;
   an optical path separation prism that is disposed between the image light emitter and the projection lens unit, and includes a first prism, a second prism, and a polarization separation coating,
   the first prism having a first surface disposed on a side of the image light emitter and perpendicular to an optical axis of the image light and a second surface intersecting the first surface,
   the second prism being disposed on a side of the second surface of the first prism, and having a third surface disposed on a side of the projection lens unit and perpendicular to the optical axis, a fourth surface intersecting the third surface and facing the second surface, and a fifth surface intersecting the third surface and the fourth surface, and
   the polarization separation coating being disposed between the second surface of the first prism and the fourth surface of the second prism;
   a narrowband retarder plate that is disposed between the image light emitter and the optical path separation prism, and aligns the image light into a first polarization state of one of P-polarization and S-polarization; and
   an imaging element that is disposed to face the fifth surface of the second prism, and images the external light via the projection lens unit and the optical path separation prism,
   wherein
   the polarization separation coating transmits light in the first polarization state, and reflects light in a second polarization state of the other of the P-polarization and the S-polarization,
   the image light is incident on the optical path separation prism from the first surface, is transmitted through the polarization separation coating, is emitted from the third surface, and is incident on the projection lens unit,
   the external light is emitted from the projection lens unit, and is incident on the optical path separation prism from the third surface, and
   light in the second polarization state in the external light is reflected by the polarization separation coating, is totally internally reflected by the third surface, is emitted from the fifth surface, and is received by the imaging element.

2. The projection display apparatus according to claim 1, wherein
   a gap is provided between the second surface of the first prism and the fourth surface of the second prism, and
   the polarization separation coating is disposed on the fourth surface.

3. The projection display apparatus according to claim 2, wherein the gap has a size from 3 μm to 10 μm.

4. The projection display apparatus according to claim 1, wherein the polarization separation coating is a wire grid polarizing plate.

5. The projection display apparatus according to claim 1, wherein an angle formed by the third surface and the fourth surface of the second prism is from 20 degrees to 35 degrees.

6. The projection display apparatus according to claim 1, further comprising a ¼ wave plate that is disposed between the optical path separation prism and the projection lens unit, converts the image light from the first polarization state into circularly polarization, and converts the external light form circularly polarization into the second polarization state.

7. The projection display apparatus according to claim 6, wherein the ¼ wave plate is detachably disposed.

8. The projection display apparatus according to claim 1, further comprising a polarizing plate that is disposed between the optical path separation prism and the imaging element, and transmits the external light.

* * * * *